C. DORFLINGER.
Lamp Chimney.
No. 36,078. Patented Aug. 5, 1862.
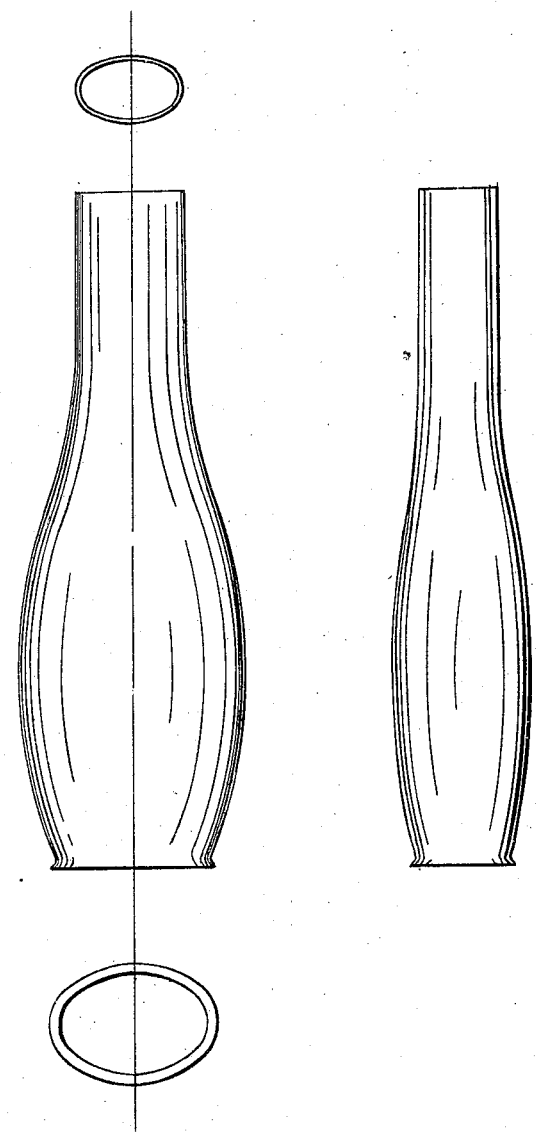

UNITED STATES PATENT OFFICE.

CHRISTIAN DORFLINGER, OF BROOKLYN, NEW YORK.

IMPROVEMENT IN LAMP-CHIMNEYS.

Specification forming part of Letters Patent No. 36,078, dated August 5, 1862.

*To all whom it may concern:*

Be it known that I, CHRISTIAN DORFLINGER, of Brooklyn, Kings county, State of New York, have invented a new and Improved Glass Chimney for Lamps Burning Kerosene, Coal, and other Fluids or Oils; and I do declare that the following is a full and exact description thereof, reference being had to the accompanying drawing.

The nature of my invention consists, first, in blowing such chimneys—neck, bulb, and base or rim—oval instead of round, as at present used, throughout its entire length, the effect being to spread the flame, whiten and reflect the light, increase its brilliancy, and the oval base or rim which rests on the lamp top insures that the chimney can only be used in its proper position—viz., so that the long axis of the oval section of the chimneys shall run through the entire breadth of the flat wicks used in such lamp, and to insure that the greatest breadth of the flame shall correspond with the greatest breadth of the oval chimneys; second, the blowing of such chimneys in a mold, which insures a perfect uniformity of size, a greater weight of glass, (enabling the bases or rims to be ground level,) reducing largely the liability of breakage and a uniformity of cooling which cannot be had in blowing without a mold, the want of such uniformity in cooling in the present method of blowing chimneys being the cause of their constant breakage upon the light being suddenly turned up within them. This method of blowing in molds is designed to prevent such breakage by equalizing the expansion and contraction of the glass on the application or withdrawal of heat more than can be done by the present method of manufacture without molds.

What I claim as my invention, and desire to secure by Letters Patent, is—

1. The blowing and molding of glass chimneys for lamps—neck, bulb, and base—oval throughout their entire length instead of round, as at present done.

2. The blowing of such chimneys in a mold, which insures perfect uniformity of size and a greater weight of glass, in the manner and for the purposes herein set forth.

New York June 13, 1862.

C. DORFLINGER.

Witnesses:
ROBERT C. EMBREE,
JOSEPH O'BRIEN.